US009361759B2

(12) United States Patent
Kelly et al.

(10) Patent No.: US 9,361,759 B2
(45) **Date of Patent: *Jun. 7, 2016**

(54) GAME METHOD USING COMMUNITY REELS

(71) Applicant: BALLY GAMING, INC., Las Vegas, NV (US)

(72) Inventors: Bryan M. Kelly, Alamo, CA (US); Michael Mitchell, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 162 days.

This patent is subject to a terminal disclaimer.

(21) Appl. No.: 13/662,969

(22) Filed: Oct. 29, 2012

(65) Prior Publication Data

US 2013/0130768 A1 May 23, 2013

Related U.S. Application Data

(63) Continuation of application No. 12/163,961, filed on Jun. 27, 2008, now Pat. No. 8,298,066.

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.

CPC ............ *G07F 17/3272* (2013.01); *G07F 17/32* (2013.01); *G07F 17/3211* (2013.01); *G07F 17/3216* (2013.01); *G07F 17/3258* (2013.01); *G07F 17/34* (2013.01)

(58) Field of Classification Search

CPC . G07F 17/32; G07F 17/3211; G07F 17/3213; G07F 17/3225; G07F 17/326; G07F 17/3274; G07F 17/3281

USPC ............................................................ 463/42

See application file for complete search history.

(56) References Cited

U.S. PATENT DOCUMENTS

| | | | |
|---|---|---|---|
| 5,342,047 | A | 8/1994 | Heidel |
| 5,393,057 | A | 2/1995 | Marnell, II |

(Continued)

FOREIGN PATENT DOCUMENTS

| | | |
|---|---|---|
| WO | WO 2007/053349 | 5/2007 |

OTHER PUBLICATIONS

Marshall Fey, "Slot Machines, A pictorial history of the first 100 years" by Marshall Fey, 5th Ed. p. 204, Liberty Belle Books, copyright 1997.

*Primary Examiner* — Tramar Harper
*Assistant Examiner* — Jeffrey Wong
(74) *Attorney, Agent, or Firm* — Philip J. Anderson; Marvin A. Hein

(57) ABSTRACT

The claimed embodiments contemplate methods, systems and apparatuses directed to gaming machines that include a community spin mechanism that, when activated, causes reel displays, at two or more player stations, to spin. Certain embodiments provide for one or more community reels that are utilized to determine an outcome of a community gaming session. The community reels are "community" in that they are formed by combining reels of individual play stations in order to increase the odds, and payouts, of potential wins via various line combinations of the combined set of reels, once they stop spinning. Re-stated, by way of non-limiting example, each play station has its own set of reels and when community play is started, one or more community reels are spun along with each players set of reels. Any potential winning combinations are then based on resulting combinations of the individual play station reels in combination with the community reels. In one embodiment, one or more dedicated reels are specifically reserved as community reels that may be used in various combinations with a player's reels and other player reels to determine potential awards. The addition of community play, via community reels, advantageously adds to the excitement and enjoyment.

20 Claims, 15 Drawing Sheets

(56) References Cited

U.S. PATENT DOCUMENTS

| | | | | |
|---|---|---|---|---|
| 6,517,433 | B2 | 2/2003 | Loose | |
| 6,652,378 | B2 | 11/2003 | Cannon et al. | |
| 6,937,298 | B2 | 8/2005 | Okada | |
| 7,070,504 | B2 | 7/2006 | Iwamoto | |
| 7,140,963 | B2 | 11/2006 | Kojima | |
| 7,220,181 | B2 | 5/2007 | Okada | |
| 7,311,608 | B1 * | 12/2007 | Danieli et al. | 463/42 |
| 7,479,065 | B1 | 1/2009 | McAllister | |
| 7,699,316 | B2 | 4/2010 | Seelig et al. | |
| 8,235,785 | B2 * | 8/2012 | Thomas | 463/16 |
| 2003/0148804 | A1 | 8/2003 | Ikeya et al. | |
| 2003/0153385 | A1 | 8/2003 | Ikeya et al. | |
| 2003/0176214 | A1 | 9/2003 | Burak et al. | |
| 2003/0224852 | A1 | 12/2003 | Walker et al. | |
| 2004/0198485 | A1 | 10/2004 | Loose et al. | |
| 2005/0014554 | A1 | 1/2005 | Walker et al. | |
| 2005/0197183 | A1 | 9/2005 | Walker et al. | |
| 2006/0046822 | A1 | 3/2006 | Kaminkow et al. | |
| 2006/0079331 | A1 * | 4/2006 | Moshal | 463/42 |
| 2006/0160614 | A1 | 7/2006 | Walker et al. | |
| 2007/0026936 | A1 | 2/2007 | Gatto et al. | |
| 2007/0149278 | A1 | 6/2007 | Walker et al. | |
| 2008/0026848 | A1 | 1/2008 | Byng | |
| 2009/0124385 | A1 | 5/2009 | Cuddy et al. | |
| 2010/0041464 | A1 | 2/2010 | Arexina et al. | |
| 2010/0267444 | A1 | 10/2010 | Walker et al. | |

* cited by examiner

GAME METHOD USING COMMUNITY REELS

CROSS REFERENCE TO RELATED APPLICATION

This application is a continuation of U.S. Ser. No. 12/163,961 filed on Jun. 27, 2008, now U.S. Pat. No. 8,298,066 issued on Oct. 30, 2012, which is incorporated herein by reference.

BACKGROUND

Various types of gaming machines have been developed with features designed to captivate and maintain player interest. In general, a gaming machine allows a player to play a game of chance in exchange for a wager. Depending on the outcome of the game, the player may be entitled to an award which is paid to the player by the gaming machine, normally in the form of currency or game credits. Gaming machines may include flashing displays, lighted displays or sound effects to capture a player's interest in a gaming device.

Another important feature of maintaining player interest in a gaming machine includes providing the player with many opportunities to win awards such as cash or prizes. For example, in some slot machines, the display windows show more than one adjacent symbol on each reel, thereby allowing for multiple-line betting. Some gaming machines offer a player an opportunity to win millions large prizes by providing progressive jackpots. Additionally, feature games of various types have been employed to reward players above the amounts typically awarded on a standard game pay schedule. Generally, such feature games are triggered by predetermined events such as one or more appearances of certain combinations of indicia in a primary game. In order to simulate interest, feature games are typically set to occur at a gaming machine on a statistical cycle based upon the number of primary game plays.

While gaming machines, including feature games, have been very successful, there remains a need for games that provide a player with enhanced excitement and increased opportunity of winning.

The foregoing examples of the related art and limitations related therewith are intended to be illustrative and not exclusive. Other limitations of the related art will become apparent to those of skill in the art upon a reading of the specification and a study of the drawings. Additionally, limitations and disadvantages of the related art may become apparent from review of other related art itself.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, white other embodiments are directed to other improvements.

An embodiment, by way of non-limiting example, provides a method for playing a game that includes activating a community spin mechanism and causing a first reel display at a first play station and a second reel display at a second play station to spin in response to the community spin mechanism.

Another embodiment, by way of non-limiting example, provides a method for playing a game that includes activating a community spin mechanism and causing a first reel display at a first play station and a second reel display at a second play station to spin in response to the community spin mechanism. Furthermore, the community spin mechanism is utilized for a community betting session involving the first and second player stations.

In yet another embodiment, by way of non-limiting example, provides a method for playing a game that includes activating a community spin mechanism and causing a first reel display at a first play station and a second reel display at a second play station to spin in response to the community spin mechanism. Furthermore, the community spin mechanism is utilized for a community winning session involving the first and second player stations.

A further embodiment, by way of non-limiting example, provides a method for playing a game that includes activating a community spin mechanism and causing a first reel display at a first play station and a second reel display at a second play station to spin in response to the community spin mechanism. Furthermore, the first and second reel displays are the same reels located in between the first and second playstations.

In yet another embodiment, by way of limiting example, provides a method for playing a game that includes activating a community spin mechanism and causing a first reel display at a first play station and a second reel display at a second play station to spin in response to the community spin mechanism. Furthermore, the first play station's reels and the second play station's reels are visible on the reel display.

An embodiment, by way of non-limiting example, provides a method for playing a game that includes activating a community spin mechanism and causing a first reel display at a first play station and a second reel display at a second play station to spin in response to the community spin mechanism. Furthermore, the first and second reel displays are visible at a top box bonus display.

Another embodiment, by way of non-limiting example, provides a method for playing a game that includes activating a community spin mechanism and causing a first reel display at a first play station and a second reel display at a second play station to spin in response to the community spin mechanism. The method also includes providing a time period to a second player at the second play station to join a community play session and blocking the second player from the community play session, if the second player does not join the community play session during the time period.

A further embodiment, by way of non-limiting example, provides a method for playing a game that includes activating a community spin mechanism and causing a first reel display at a first play station and a second reel display at a second play station to spin in response to the community spin mechanism. Furthermore, the first and second play stations are funded via a single currency acceptor and funds, entered via the single currency acceptor, may be routed to, in varying proportions, to the first and second play stations.

In addition to the example aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting—they provide examples of embodiments.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments mutually exclusive of other embodiments. These details are intended to be illustrative examples and not limitations of inventive scope.

Embodiments enclosed herein contemplate methods, systems and apparatuses directed to gaming machines that include a community spin mechanism that, when activated, causes reel displays, at two or more player stations, to spin. Certain embodiments provide for one or more community reels that are utilized to determine an outcome of a community gaming session. The community spin mechanism may include one button for multiple players or one or more buttons at each player station that may be pressed to enable community play. The community reels are "community" in that they are formed by combining reels of individual play stations in order to increase the odds, and payouts, of potential wins via various line combinations of the combined set of reels, once they stop spinning. Re-stated, by way of non-limiting example, each play station may have its own set of reels and when community play is started, one or more community reels are spun along with each player's set of reels. Any potential winning combinations are then based on resulting combinations of the individual play station reels in combination with the community reels. In one embodiment, one or more dedicated reels are specifically reserved as community reels that may be used in various combinations with a player's reels and other player reels to determine potential awards. The addition of community play, via community reels, advantageously adds to the excitement and enjoyment and therefore the profitability of the machine.

In one embodiment, each player may be awarded winning combinations displayed at their respective play stations and this may be referred to as "community betting." In another embodiment, both players are rewarded winning combinations from both play stations and this is referred to as "community winning."

Figure 1:
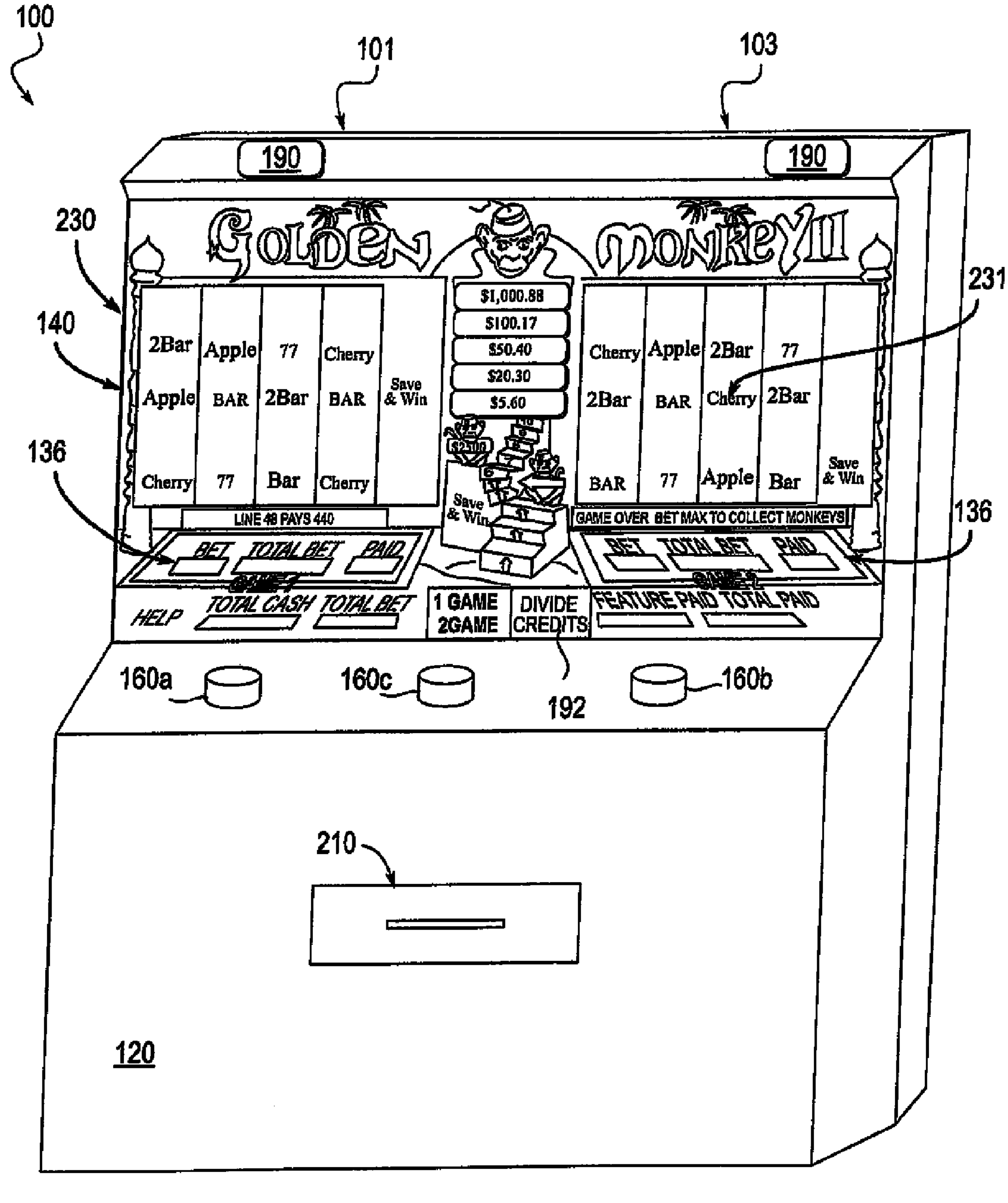
FIG. 1 is a perspective view of an example of a gaming machine that may be utilized by the claimed embodiments.
Figure 2:
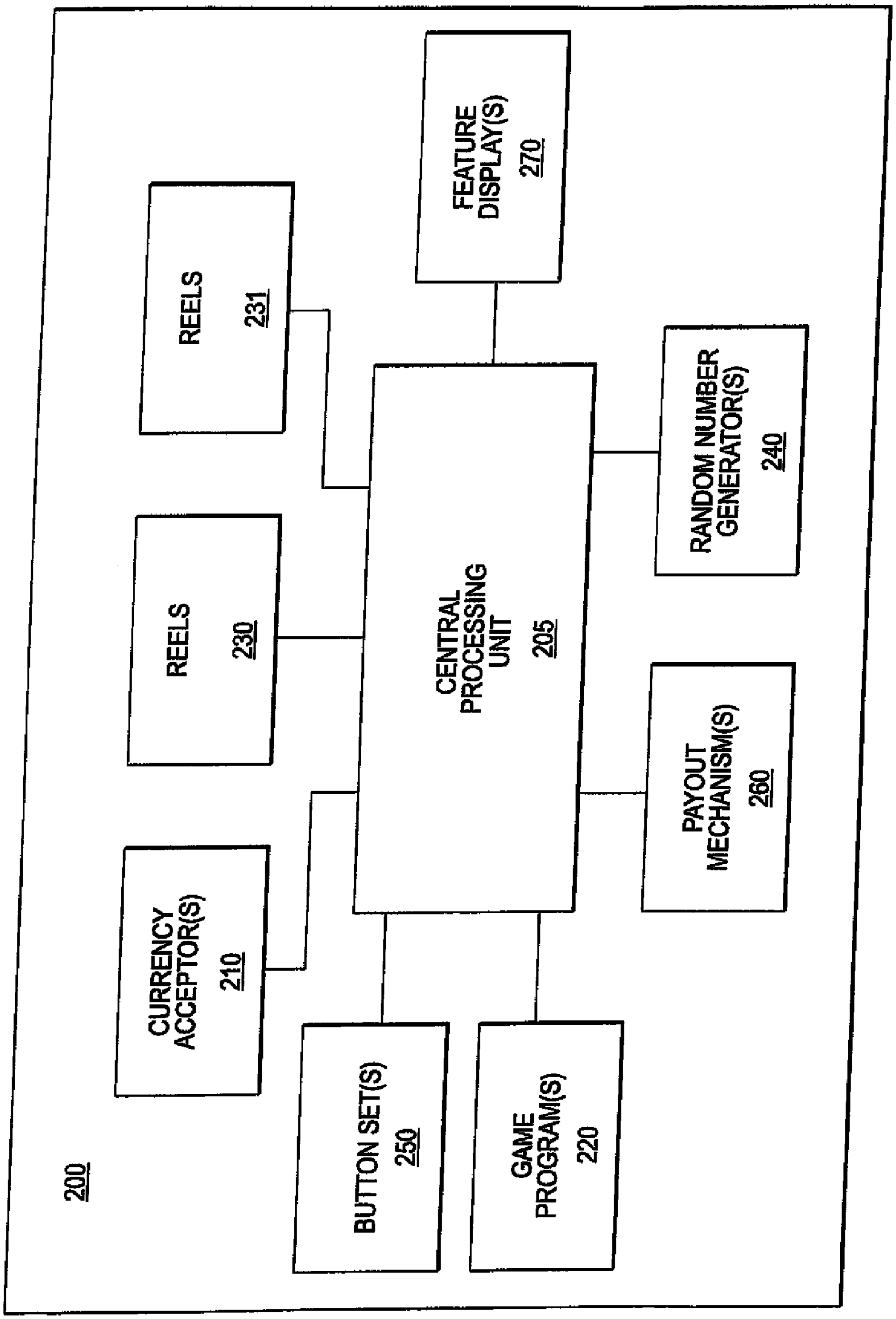
FIG. 2 is a block diagram illustrating examples of physical and logical components of the gaming machine of FIG. 1, in accordance with an embodiment.

Aspects of the claimed embodiments may be realized via FIG. 1 which is a perspective view of a gaming machine 100. FIG. 2 which is a block diagram illustrating physical and logical components of the gaming machine 100 and FIG. 3 which is an enlarged view 300 of the gaming display 140 of FIG. 1.

Turning to FIG. 1, gaming machine 100 is configured to allow two players to each operate separate game sessions. For example, as depicted in FIG. 1, a first player may play at a first player station 101 of gaming machine 100 and a second player may play at a second play station 103 of gaming machine 100. Upon satisfaction of various conditions, which will be described in later sections, outcomes of separate game sessions may be linked. It should be understood that the "side-by-side" player configuration of gaming machine 100 may be implemented in various other physical layouts which can also include geographically-separate cabinet housings.

It should also be noted that various gaming machine implementations mentioned in reference to specific embodiments may also be implemented via other embodiments even if it is not expressly stated to do so.

Gaming machine 100 includes cabinet housing 120, game display 140, player activated buttons 160*a*, 160*b* and 160*c* (collectively "160"), player tracking panels 136, currency acceptor 210 and one or more speakers 190. Cabinet housing 120 is a self-standing unit that is generally rectangular in shape and may be manufactured with reinforced steel or other rigid materials which are resistant to tampering and vandalism. Cabinet, housing 120 houses one or more processors, circuitry and software (not shown) for receiving signals from the player-activated buttons 160, operating the games and transmitting signals to the respective displays and speakers.

Any shaped cabinet may be implemented with any embodiment of the gaming machine 100 so long as it provides access to a player for playing a game. For example, cabinet 120 may also comprise a slant-top, bar-top or table-top style cabinet. The operation of gaming machine 100 is described more fully below.

Reel sets 230, 231 may be mechanical, video or combinations thereof. Each reel set 230, 231 includes a number of reels, as would be appreciated by those skilled in the art. For video reels, game display 140 is, typically, a CRT or flat panel display in the form of, but not limited to, liquid crystal, plasma, electroluminescent, vacuum fluorescent, field emission or any other type of panel display known or developed in the art. Game display 140 may be mounted in portrait mode, landscape mode or other orientations.

The plurality of player-activated buttons 160 may be used for various functions such as, but not limited to, selecting a wager denomination, selecting a game to be played, selecting a wager amount per game, initiating a game or cashing out money from gaming machine 100. Buttons 160 function as input mechanisms and may include mechanical buttons, electromechanical buttons, touch screen buttons or other types of buttons. In one embodiment, buttons 160*a* and 160*b* are utilized to initiate rotation of reel sets 230 and 231, respectively, during play of each player side of gaming machine 100. When depressed, button 160*c* results in rotation of reel sets 230 and 231, as will be further described in a subsequent section. Optionally, a handle (not shown) may be rotated by a player to initiate a game, thereby serving as a "button." An optional gesture input device may be used such as a multi-touch touch-screen, touchpad or camera gesture detection system as optional inputs to initiate and configure a game.

In other embodiments, buttons 160 may be replaced with various other input mechanisms known in the art such as, but not limited to, a touch screen system, touch pad, track ball, mouse, switches, toggle switches, levers, handles, knobs or other input mechanisms used to accept player input.

Game display 140 may also present information such as, but not limited to, player information, advertisements and casino promotions, graphic displays, news and sports updates or even offer an alternative game. This information may be generated through a host computer networked with gaming machine 100 on its own initiative or it may be obtained by request of the player using either one or more of the plurality of player-activated buttons 160; the game display itself, if game display 140 comprises a touch screen or similar technology; buttons (not shown) mounted about game display 140 which may permit selections such as those found on an ATM machine, where legends on the screen are associated with respective selecting buttons; or any player input device that offers the required functionality. Alternately an associated Bally iVIEW display device or iVIEW DM ("Display Manager") may be used to render this content and provide user input.

Cabinet housing 120 incorporates one game display 140 utilized by the first and second play stations 101, 103. However, in alternate embodiments, cabinet housing 120 may house two displays e.g. for each of play stations 101, 103. Additional displays or components may be used for various purposes including additional game play screens, animated "top glass," progressive meters or mechanical or electromechanical devices such as, but not limited to, wheels, pointers or reels. The additional displays may or may not include a touch screen or touch glass system.

In an embodiment, after a player inserts payment into currency acceptor 210, the player may select to divide the inserted payment between the first and second play stations 101, 103 via a divide credits portion 192 of game display 140. A graphical user interface (GUI) may be shown to the players to select where the funds are to be sent. For example, a player 1 credit meter, player 2 credit meter to player N credit meter, evenly split between them or weighted or distributed in any percentage to 1 or more player meters or a specific amount of total currency/ticket inserted or transferred funds to each player's meter. In another embodiment, the first and second play stations 101, 103 each have their own currency acceptors 210 and use of the divide credits portion 192 will therefore be optional. For example, it still may be desirable to provide functionality to transfer funds between the first and second play stations 101, 103 when they each have their own currency acceptor 210. U.S. patent application Ser. No. 11/456,528, filed on Jul. 10, 2006, is incorporated herein by reference for technical disclosure.

FIG. 2 is a block diagram illustrating examples of physical and logical components 200 of the gaming machine 100 of FIG. 1. Included is a central processing unit 205 to which various components are coupled. Those components include a currency acceptor(s) 210, reel sets 230 and 231, feature display(s) 270, random number generator(s) 240, payout mechanism(s) 260, game program(s) 220 and button set(s) 250.

CPU 205 may be a processor mounted on a gaming motherboard. For example, CPU 205 may be a microprocessor made by Intel, AMD or others. The gaming motherboard may be mounted with other components, similar to those that may be found on a personal computer motherboard, and is operable to be loaded with a gaming machine operating system ("OS") such as an Alpha OS installed within a Bally S900, M9000 or Cine Vision™ slot machine. CPU 205 executes a game program 220 that causes reel sets 230, 231 to display a game.

When a player has inserted a form of currency such as, for non-limiting example, paper currency, coins or tokens, cashless tickets or vouchers, electronic funds transfers or the like into the currency acceptor 210, a signal is sent to the CPU 205 which, in turn, assigns an appropriate number of credits for play. The play may further control the operation of the gaming machine 100, for example, to select the amount to wager via, for example, electromechanical or touchscreen buttons 250. The game may start in response to the player pushing one or more buttons 250 or an alternate mechanism such as a handle or touchscreen icon (not shown).

Random number generator 240 responds to instructions from CPU 205 to provide a display of randomly selected indicia on reel sets 230 or 231. In some embodiments, random number generator 240 may be physically separate from gaming machine 100; for example, it may be part of a central determination host system (not shown) which provides random game outcomes to CPU 205. Thereafter, the player may or may not interact with the game through electromechanical or touchscreen buttons 250 to change the displayed indicia.

CPU 205 under control of game program 220 (typically stored in read only memory or read/write memory) compares the final display of indicia to a pay table. The set of possible game outcomes may include a subset of outcomes related to the triggering of a feature game. In the event the displayed outcome is a member of this subset, CPU 205, under control of game program 220, may cause feature game play to be presented on feature display 270.

In one embodiment, reel sets 230, 231 are electomechanical reels. Game program 220 includes reel spinning firmware to provide proper signals for driving multiple stepper motors (not shown), which, in turn spin the reel sets 230, 231. Preferably, the motors are driven using a "full step" excitation sequence in which a single motor step is performed by changing the excitation sequence in which a single motor step is performed by changing the excitation on one of the two-phase inputs in a specified sequence. The sequence determines whether the direction implemented is forward or reverse. The reel drive pulse trains go through three distinct stages: acceleration, steady state and deceleration. During acceleration, reel sets 230, 231 are driven with a pulse frequency that is less than the maximum "start/stop" frequency. Typically, if a motor is attempted to be started with a high frequency pulse, the motor loses synchronization and slips. Therefore, preferably the drive frequency is incrementally increased until the steady state drive frequency is reached. At steady state, reel sets 230, 231 are driven for a specified number of steps at the maximum drive frequency before going to the deceleration phase. During deceleration, the process is reversed and the drive frequency decreased until the stopping frequency is reached. Preferably, this procedure helps to prevent reel sets 230, 231 from slipping past the proper stop position on deceleration. Finally, at the stopping point, the motor excitation signals are held constant.

Predetermined payout amounts for certain outcomes, including game outcomes, are stored as part of game program 220. Such payout amounts are, in response to instructions from CPU 205, provided to the player in form of coins, credits or currency via payout mechanism 260, which may be one or more of a credit meter, a coin hopper, a voucher printer, an electronic funds transfer protocol or any other payout means known or developed in the art. CPU 205 also maintains one or more sets of accounting meters (not shown) which encompass the credit meter, a wager meter and a win meter.

In various embodiments of gaming machine 100, game program 220 is stored in a memory device (not shown) connected to or mounted to the gaming motherboard. By way of non-limiting example, such memory devices include external memory devices, hard drives, CD-ROMs, DVDs and flash memory cards. In an alternative embodiment, the game programs are stored in a remote storage device. In one embodiment, the remote storage device is housed in remote server. The gaming machine may access the remote storage device via a network connection, a TCP/IP connection, a wireless connection or any other means for operatively networking components together. Optionally, other data including graphics, sound files and other media files for use with gaming machine 100 are stored in the same or a separate memory (not shown). Some or all of game program 220 and its associated data may be loaded front one memory device into another, for example, from flash memory to random access memory (RAM).

In one embodiment, the CPU 205 is operative to host multiple virtual machines that may be utilized to run various games, perhaps at a remote location. In another embodiment, the CPU 205 has multiple cores and each core is operative to run a gaming machine. In yet another embodiment, multiple CPUs are present and each CPU is operative to run a game on a gaming machine. In still yet another embodiment, CPU 205 contains more than one set of game instructions, each set corresponding to a different game.

Also, in an embodiment, each player may have their own set of accounting meters, each set maintained by separate CPUs or virtualized CPUs or processes. Similarly, each player may share one credit meter but then have separate wager and win meters. In another embodiment, one set of accounting meters is shared between multiple players. These accounting meters could be reported as one combined meter set to the host slot management system or as separate virtual EGM meters running on one physical device. In effect, multiple Gaming Standard Association's GSA through G2S devices may be present in one physical cabinet. The main game processor or system processors (iVIEW and/or GMU or server process) may maintain any or all of the G2S base classes for each instance. The G2S host will typically maintain the association of each virtualized G2S device with a common physical asset or gaming device.

Figure 3:
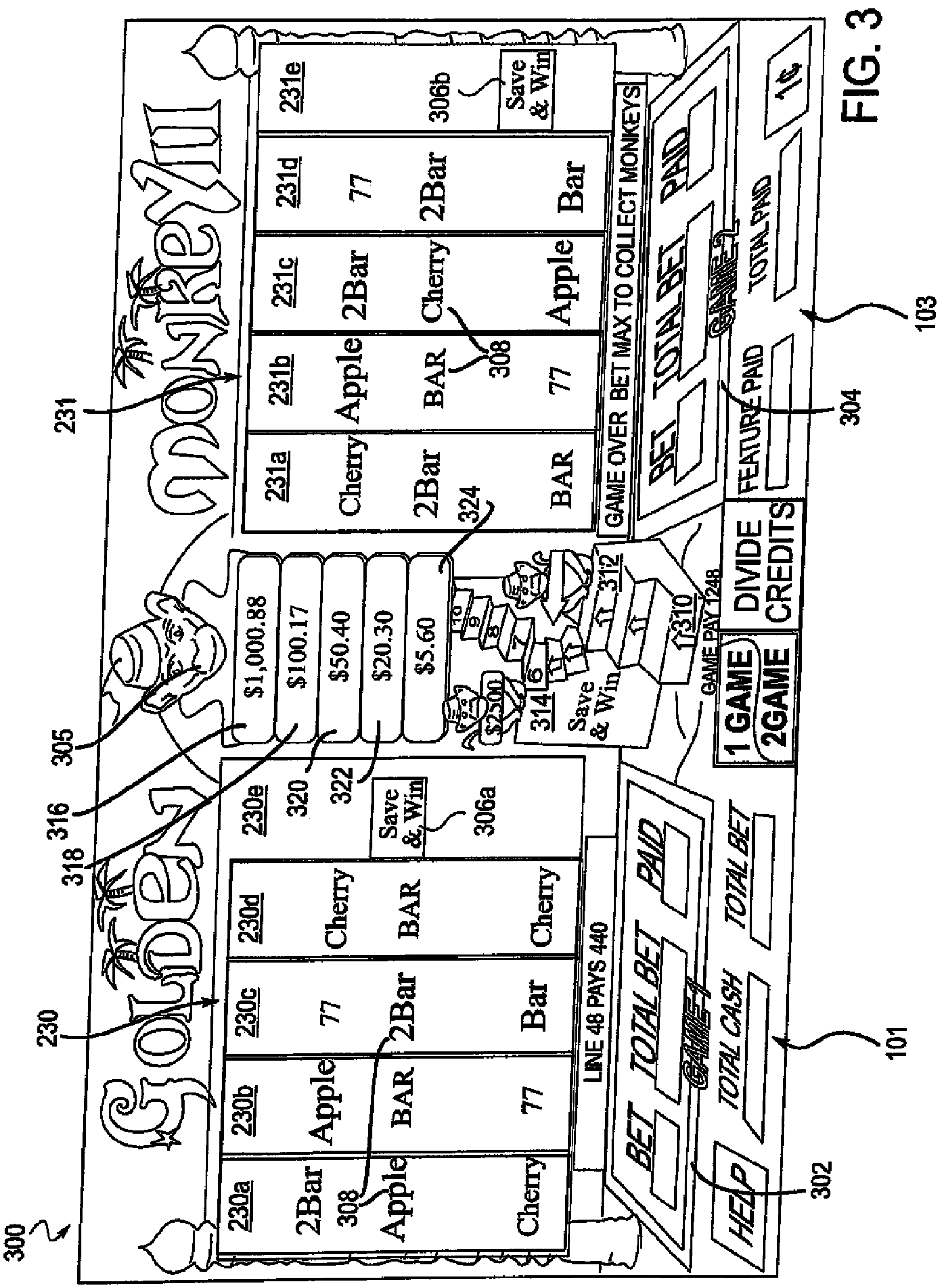
FIG. 3 is an enlarged view of the gaming display of FIG. 1.

Referring to FIG. 3, which is an enlarged view 300 of the gaming display 140 of FIG. 1, various community reels embodiments are shown. View 300 includes first and second play stations 101, 103. Each play station, 101, 103 includes reel sets 230, 231 of multiple reels and bet indicators 302, 304 that convey a current bet, a total bet and amount paid. View 300 also includes a progressive bonus section 305 and credit indicators 304, one of which is the aforementioned divide credits portion 192.

During a game session, for either play station 101, 103, four of the five reels (230*a*, 230*b*, 230*c*, 230*d* for station 101; 231*a*, 231*b*, 231*c*, 231*d* for station 103) are spun once a bet is placed (number of credits to bet and number of lines to bet). If both players wager a certain bet size within a pre-defined time period, the fifth reel 230*e*, 231*e* for both play stations 101, 103 are spun at the same time as reel sets 230 and 231. This results in higher odds of winning larger amounts for each player as a number of potential winning line combinations or line lengths, at each play station 101, 103, is increased due to use of the fifth wheels 230*e*, 231*e*. In particular embodiments, similar wagers are highest available wagers. In one embodiment, winning line combinations spanning across all the reels (230*a*-230*e* and 231*a*-231*e*) are awarded to both players and this may be referred to as "community play," "buddy play" and the like.

When both play stations 101, 103 are in use, the community spin button 160*c* (not shown/refer to FIG. 1) may be depressed by either player to initiate community play which causes all the reels (230*a*-230*e* and 231*a*-231*e*) to spin. In one embodiment, reels may stop one by one in a pre-defined manner or perhaps a stopping pattern may be randomly selected from a group of pre-defined stopping patterns. Examples of such stopping patterns may be, but not limited to, from left to right, right to left or stopping the reels simultaneously.

The fifth reel 230*e*, 231*e* has a "golden money" symbol 306*a*, 306*b* and may be utilized as part of a bonus round/progressive award. If the golden money symbol 306*a*, 306*b* stops at a center position 308 then a bonus round counter (save and win) is incremented by one and visually communicated by illuminating steps 310 starting at the base step. This may occur as a result of the aforementioned bet threshold in a certain time period or when community play is commenced. Incrementing or illuminating each step occurs when either players symbol 300*a*, 306*b* stops at the center position 308. When a third step 312 is attained and when a sixth step 314 is attained, the player that attained the step is asked a question—"Take bonus now or Play on?" If "Take bonus now" is selected then a smaller bonus or progressive, in view of a larger bonus by playing on, is added to both player's win meters. In one instance a Take Bonus Now feature may trigger a bonus round feature common or distinct for each player.

The progressive bonus has five levels of progressives (316, 318, 320, 322, 324) that may be awarded to the player who plays on. An advantage of playing on is that the player will eventually attain the top progressive 324. After "Play on" is selected, a bonus game ensues wherein the progressives (316-324) are randomly covered up one by one until just a single progressive remains visible which is awarded to the player. The covering process is a tease to the player because each new covering narrows the field of uncovered progressives that could be rewarded. Restated, once a progressive is covered, it is no longer available to be rewarded. The specific progressive chosen to be given to the player is determined by a random number generator where each progressive has a different weight or probability. This weighting may be affected by the player's recent wagers which resulted in the bonus round occurring. After the progressive is awarded, the bonus round counter is reset to zero and any illuminated steps 310 are shut off.

Advantageously, both players advance each other to a common bonus game, via the golden money symbols 306*a*, 306*b* on the fifth reels 230*e*, 231*e*. One player may be the bigger contributor than the other, but they both benefit.

When a multi-player gaming session comes to an end, the players will potentially have a number of cash-out options. These options include, but not necessarily limited to, printing one credit ticket worth an amount of the balances from credit meters of the play stations 101, 103, print two tickets reflective of a balance on each credit meter or two tickets valued at selected percentages from each credit meter. Another cash-out option may be that the balances will be combined into one amount and a partial cash-out ticket is issued in an amount desired by the player. A user interlace may be provided to the players to let them decide which type of cash-out and the amounts to cash-out. Another embodiment provides for each player having their own printer for printing cash-out tickets, but share one common bill/ticket acceptor. In this instance each player is allowed to cash-out without interfering with the other player.

Figure 4:
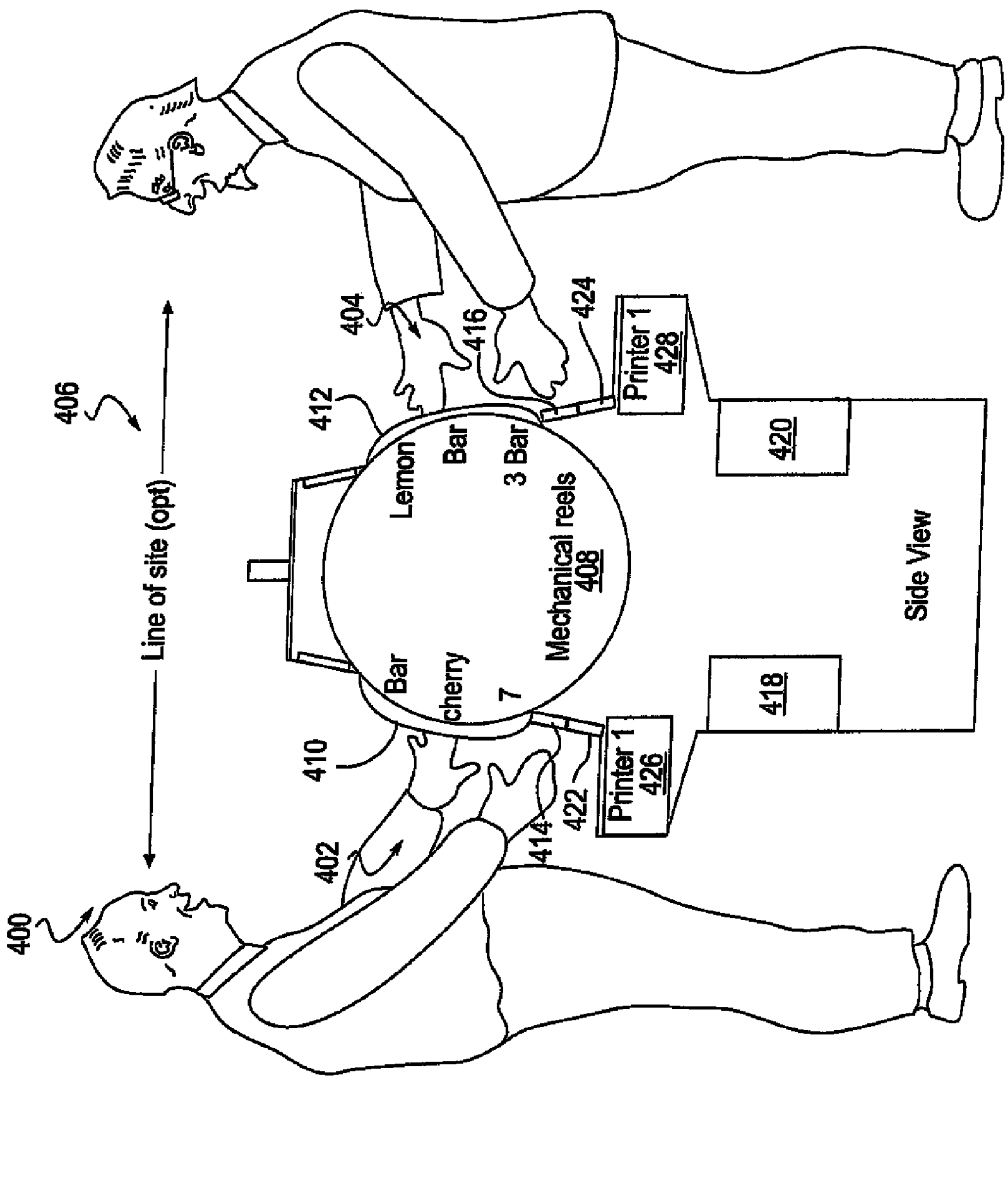
FIG. 4 is a diagram illustrating an example of a community reels gaming device, in accordance with an embodiment.

FIG. 4 is a diagram illustrating a community reels gaming machine 400 of a different configuration of that of FIGS. 1 and 3. Gaming machine 400 provides for two play stations 402, 404 situated back-to-back which may be low enough to allow players at each play station 402, 404 to see each other via a line of sight 406. Such a feature advantageously adds to the gaming experience in that one player at play station 402 can easily talk to and see expressions of a player at corresponding play station 404 and vice-versa. Such interaction will typically encourage longer gaming sessions.

Gaming machine 400 includes a common set of reels 408 visible at each play station 402, 404 through a protective covering 410, 412 such as glass, plexiglass and the like. Reels 408 may extend out from gaming machine 400 in order to enhance visibility. Typically, each play station 402, 404 will have their own set of game meters 414, 416 which includes a number of lines to wager, wager or bet size, a win meter and a credit meter. Similar to gaming machine 100 of FIG. 1, gaming machine 400 may include a common credit meter for the two play stations 402, 404 but have separate win meters. Gaming machine 400 depicts two currency acceptors 418, 420 but may have just one currency adaptor wherein players are then given options to split inserted funds between the two play stations 402, 404. Each play station 402, 404 will also typically include a control panel 422, 424 and a printer 426, 428 for issuing credit vouchers at an end of a gaming session.

Gaming machine 400, and other gaming machines, may also Include video touchscreen LCD displays at each play station 402, 404 to display game related data such as bonus games, pay tables, help, game meters and the like. Alternatively, or in combination with additional LCD displays, the protective covering 410, 412 may be a transmissive LCD display to allow video content to be displayed over the mechanical reels. Transmissive displays are described in U.S. Pat. Nos. 6,937,298, 7,070,154, 7,140,963 and 7,220,181 which are herein incorporated by reference.

Typically, players at each play station 402, 404 are able to wager separate amounts. When both players wager a maximum bet within a certain time period, community play be started wherein higher payout tables, different game settings, frequency of wins, payout percentages and the like are utilized. Community play can also be started via depression of a community play button (not shown) at either play station 402, 404. In one embodiment, depression of a community play button at one play station may require depression of a corresponding community play button at the other play station in order to start community play.

In one embodiment, opposite sides of the reels 408 are identical such that combinations at a center line visible at each play station 402, 404 are identical. In this embodiment when one player wins the other player knows that they win the same thing at the same time if they joined in community play. Alternatively, they may feel they are in competition with each other. One person's win is typically, in some implementations, another person's loss since they are playing on the opposite side of the reels. In another embodiment, the reels are video reels simulating the appearance of mechanical reels and displayed line combinations at each play station 402, 404 are identical. That is, players at each play station 402, 404 are playing a same set of reels. In yet another embodiment, each player may have their own set of reels and share one or more community reels that are utilized for community play.

In other embodiments, games may have skill options such as hold, re-spin, nudge up and nudge down. Players can, for example, lock in their choices and each would then get their skill choices in sequence. Alternatively, common choices, of both players, would cause the reels to re-spin/nudge accordingly. Typically, games with skill options involve several reel spins in order to complete a game session.

Figure 5:
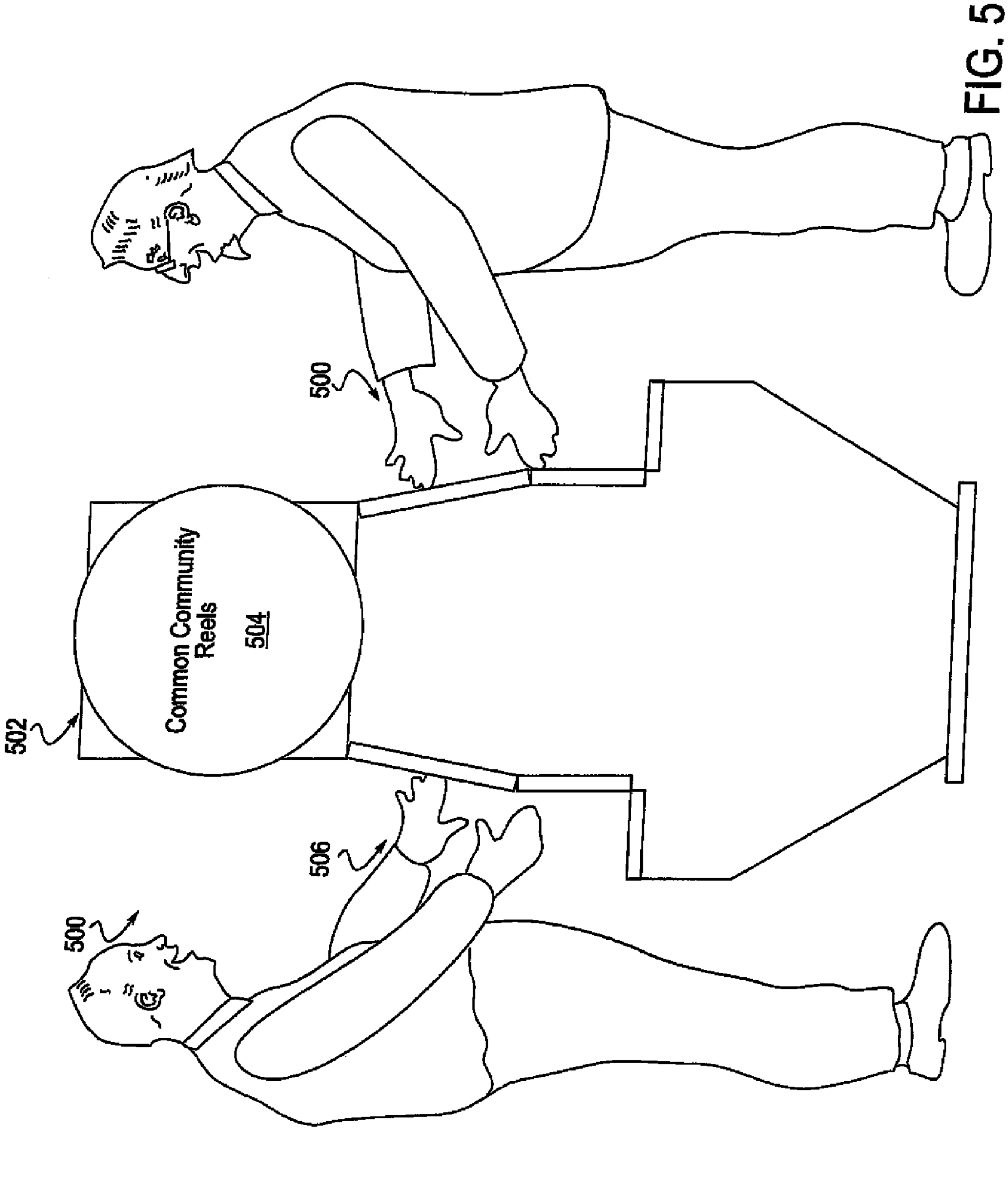
FIG. 5 is a diagram illustrating another example of a community reels gaming device, in accordance with an embodiment.

Another embodiment of a community reels gaming device 500 is contained in the diagram of FIG. 5. Gaming device 500 includes a top box 502 containing a set of community reels 504 and play stations 506, 508 configurable to be a video or mechanical reels game. An example video game is video poker or another skill-type game. While not shown, gaming device 500 will also typically include, at each play station 506, 508, game meters, a player tracking console, printer, currency acceptor, etc. One possible installment option for gaming machine 500 is to batik multiple ones in rows. Community play may be started via similar methods that were previously described such as players placing maximum bets within an allotted timeframe, depressing a community play button, etc.

Figure 6:
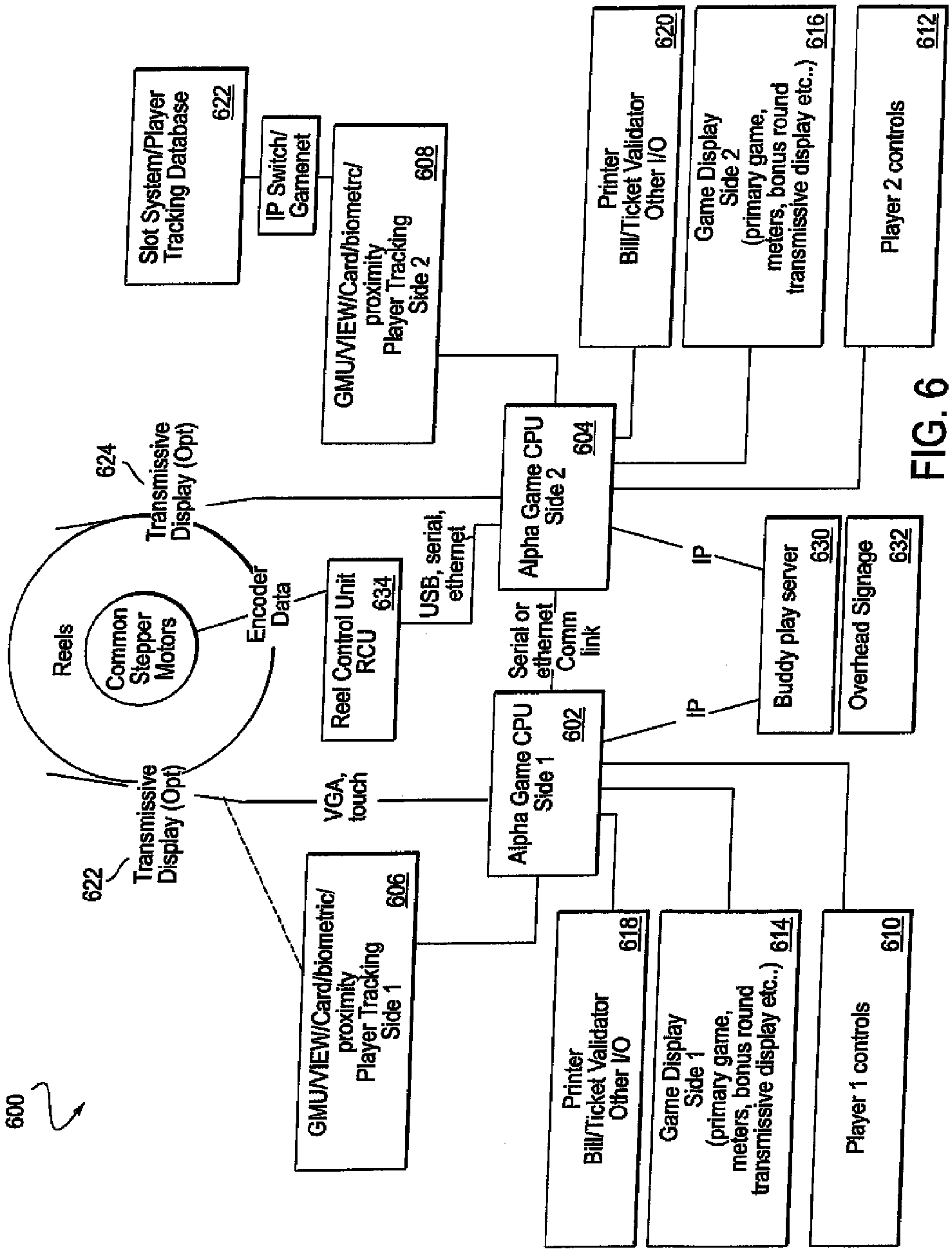
FIG. 6 is a block diagram illustrating examples of electrical components of a community reels gaming device, in accordance with an embodiment.

FIG. 6 is a block diagram 600 illustrating examples of typical electrical components of a community reels gaming device, such as gaming devices 400 and 500. In one embodiment each play station of a gaming device utilizes a CPU 602, 604 and a game monitoring unit ("GMU") 606, 608 for player tracking. The CPUs 602, 604 may be in communication with each other to enable community play features. One of the CPUs 602, 604 may act as a master of both play stations. Or, the CPUs may exchange outcome information (reel stops and/or RNG outcomes) about their respective play stations. Reels 626 will typically be controlled by a reel control unit 634.

In some embodiments each CPU 602, 604 may utilize the same random numbers generated from a master random number generator (not shown) or utilize separate random number generators with and identical seeds to produce the same random number patterns. These random number generators may be at a server or on one or the other gaming CPUs or associated system, processors.

In alternate embodiments there may only be one CPU and a credit card reader (not shown) and currency acceptor (not shown) attached to each GMU 606, 608. Each play station also typically has a set of player controls 610, 612, video LCD or LED meter displays 614, 616 and a printer 618, 620. One GMU, or perhaps one CPU, may be utilized to maintain a game session occurring at each play station. This can be realized by using a "game 2 system" (G2S) communication protocol.

Multiple transmissive-touchscreen LCD overlay panels 622, 624 may be used to provide information (video games, bonus rounds, game meters, alternate interlaces, etc) on top of the mechanical reels 626. Or, specific reels may be blocked from view for players based upon a mode of play. Players may share a set of reels or perhaps each have their own reels.

Gaming machine 600 may also be connected to a slot system/player tracking database a buddy play server 630 via an IP or other equivalent switch. The buddy play server is also typically supplied with overhead signage information 632 displayable at each play station's overhead sign (not shown).

In one embodiment a video mixer processor hoard (known under the trade name of "Bally iVIEW DM") may combine video signals from the two Bally processors and present the merged data on one screen, perhaps sealing the content if required. When screen content is scaled/positioned by a mixer the touchscreen data generated by the touchscreen controller may also perhaps need to be rescaled or adapted so newly positioned buttons that are touched by the player have the touchscreen controllers coordinates re-mapped to where the coordinates were originally for the non-scaled game content for each processor. These re-scaled touchscreen presses may be sent to both game processors, so they can execute their respective business or game logic. This advantageously allows for two regulated gaming devices to be inside one cabinet and each render to the same game screen(s). Each gaming processor may implement its own gaming logic as if it was a separate or adjacent gaming device. Messaging between the two gaming processors would occur to ensure each knows the others state of the game, and all other data regarding community reels, wagers, outcomes, payouts, meters, etc. Community reels would typically be shown at the junction of the mixed/merged video content rendered from each gaming processor. U.S. Provisional Patent Application Ser. No. 61/019,824, filed on Jan. 8, 2008, is incorporated herein by reference for technical disclosure.

Bally iVIEW DM mixing may be controlled by either base game processor upon request or by one machine designated as the master. One of the Alpha gaming processors video outputs may be configured by the iVIEW DM video mixer/sealer to take over the entire common display for certain modes of play including but not limited to bonus modes, single player mode, tournament mode. etc. Alternately the Bally iVIEW DM mixer/sealer may be controlled by a server or a Bally iVIEW processor. Also System generated or originated content can also be combined on the same screens using this same video mixer processor board. The output from one or two iVIEW processors can be rendered on the same display screen as the 2 or more Bally Alpha suitcase processors. More than 2 video game processors can be mixed/sealed to the same game screen(s) using the Bally iVIEW DM.

Figure 7:
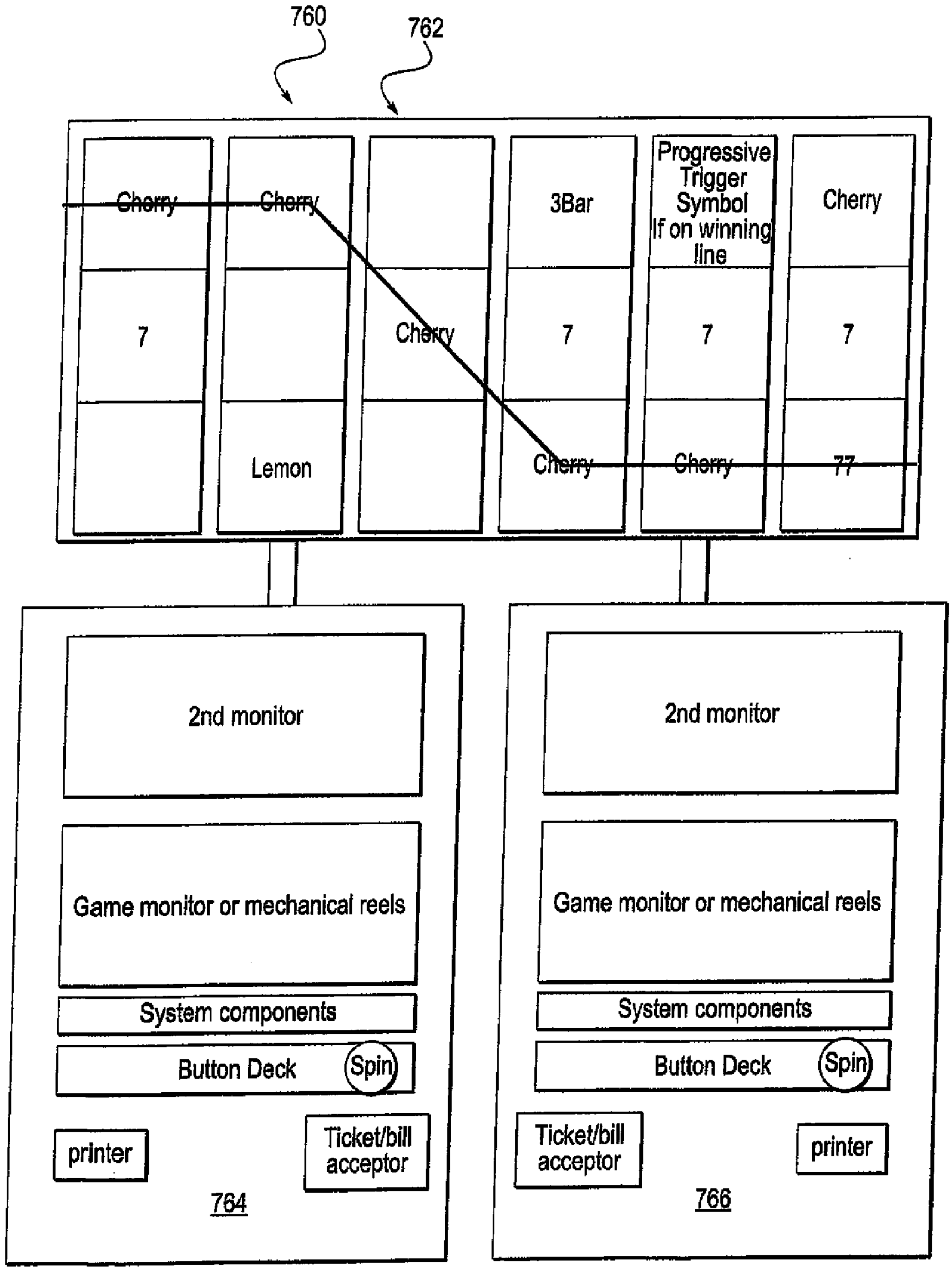
FIG. 7 is a block diagram illustrating an example of a side-by-side gaming apparatus with overhead community reels, in accordance with an embodiment.

FIG. 7 is a block diagram illustrating a side-by-side gaming apparatus 760 with overhead community reels 762, in accordance with an embodiment. Gaming machines 764 and 766 may be physically separate or contained in a single cabinet. More than two gaming machines could also be utilized with the overhead community reels 762. A player at each game machine 762, 764 are able to spin one or more of the reels 762 and winning lines resulting from a combination of all the reels 762 are awarded to each player.

A number of players, an amount of wagering and combinations of both may influence game payouts (frequency and amount). For example, game payouts may be increased when there are more than a certain number of players. Alternatively, if there are fewer players and perhaps less wagering, then game payouts may be reduced. Winnings may be deposited to a player account or redeemable, via a printed ticket. Determination of winning combinations may be done at a community reels controller (not shown) and the results are sent to the gaming devices 764, 766. Alternatively, the controller may send data to the gaming devices 764, 766 which will then perform the determination.

In one embodiment, a set of reels are enabled when each gaming machine they are associated with are being played or when a certain amount of wagering is occurring. Otherwise the reels are not available for play. This advantageously encourages players to wager at multiple adjacent gaming machines or perhaps to encourage more people to play. Enabled reels may be highlighted to show that they are enabled or fully funded. In various implementations, players may not receive certain award combinations unless more reels are enabled to get the longer winning payline combinations.

In one embodiment the outcome of the reels on the overhead community display may trigger secondary gaming events on the main game screen. In this case the community overhead display bonus game triggers a bonus event on the main game. This can be a different bonus event on the main game for each player or a common one on each players display device.

In another embodiment a player spins one or more reels associated with his play station and the other reels, associated with play stations not in use, remain fixed. Once the one or more reels stop then any winning combinations from all reels are determined. Alternatively, if enough reels associated with the player's play station are spun, winning combinations may be determined from just those reels. Any resulting awards are given to the player who triggered the spin on the top set of reels 702 and other players would not be awarded.

Figure 8:
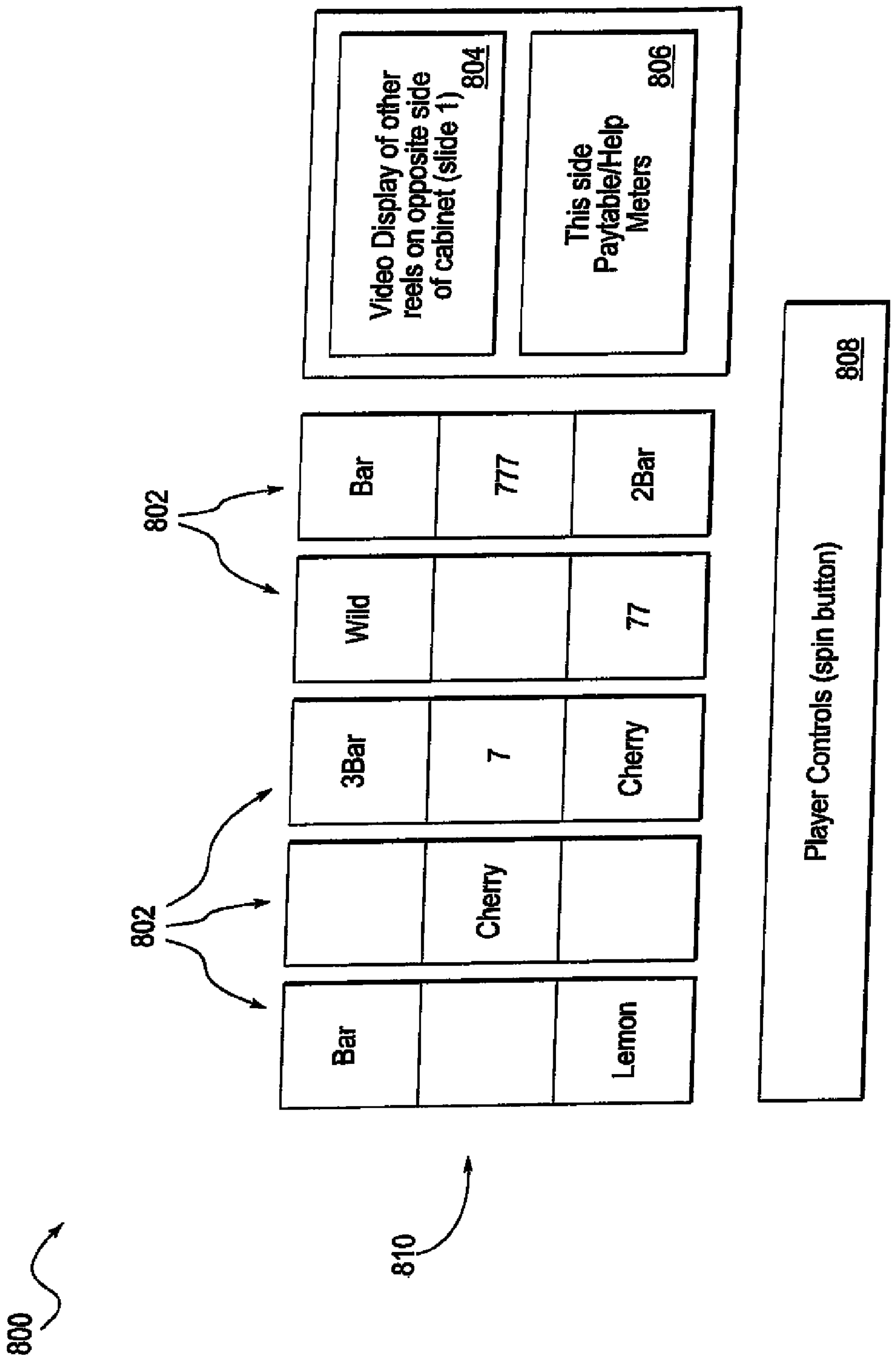
FIGS. 8-12 are block diagrams illustrating examples of reel displays, in accordance with embodiments.

The next set of figures, FIG. 8-12, are illustrations of various reel displays that may be utilized in the previously-described embodiments. Referring to FIG. 8, reel display 800 includes five reels 802 of a first player's play station, some of which may be community reels. Also included is a view 804 of a second player's reels at a second play station which may be adjacent to, opposite to or remotely positioned. Furthermore, reel display 800 may also include a meters section 806 and a player control section 808. The second player will also have a similar reel display as reel display 800. That is, they will have a view of their reels, a view of the other player's reels, meters and player controls. This particular embodiment may be useful in situations where players do not have eye contact with the other player. However, this embodiment is not limited to such a situation. In one implementation wherein one player's game display is rendered on another player's display, and there are two or more game processors, this may be accomplished using video-streamed data, over Ethernet or other methods, from one gaming processor to the other processor. Alternately, representative data can be sent from one game processor to the a second game processor. The second game processor being capable of processing the representative data and rendering the first gaming device's gaming content on its own display. A portion of another player's screen, may show, of another player, or other players, one or more reels, game meters rendered in a 1:1 scale or other configurations as appropriate.

Similar to previously described embodiments, reels 802 may be mechanical or video reels. Alternatively, some reels 802 may be mechanical while others are video reels. Additionally, reels 802 may be configured such that a center line 810 of symbols at one player's play station is the same as a corresponding player's play station center line. Additionally, reels that are community reels may be specifically labeled, highlighted or otherwise designated as being a community reel.

Figure 9:
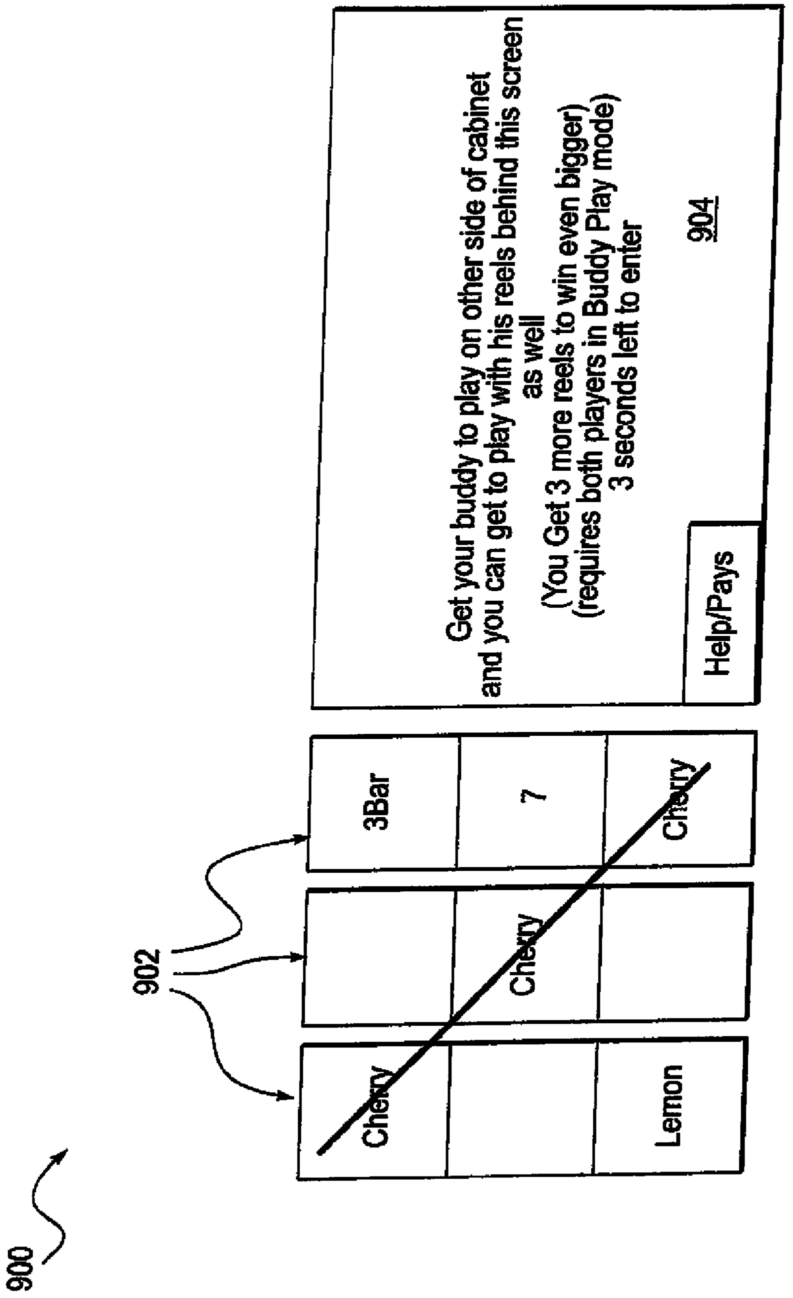

Turning to FIG. 9, reel display 900 depicts a non-community play view which shows three reels 902 available for play. A transmissive display 904 is blocking three community reels from view. It should be noted that reel display 902 may be covered with a display that is mostly, if not all, transmissive. Alternatively, more than just area 904 or perhaps areas other than 904 may be a transmissive display. When in single player mode, typically the first reels 902 will be utilized to determine winning combinations. In community play mode, transmissive display 904 is unblocked to show community reels. A similar reel display may be available at a corresponding play station wherein another player has a set of reels for individual play and a set of reels covered up by a transmissive display during non-community play. When video reels are involved, use of a transmissive display, for purposes of blocking an underlying display, is optional.

Figure 10:
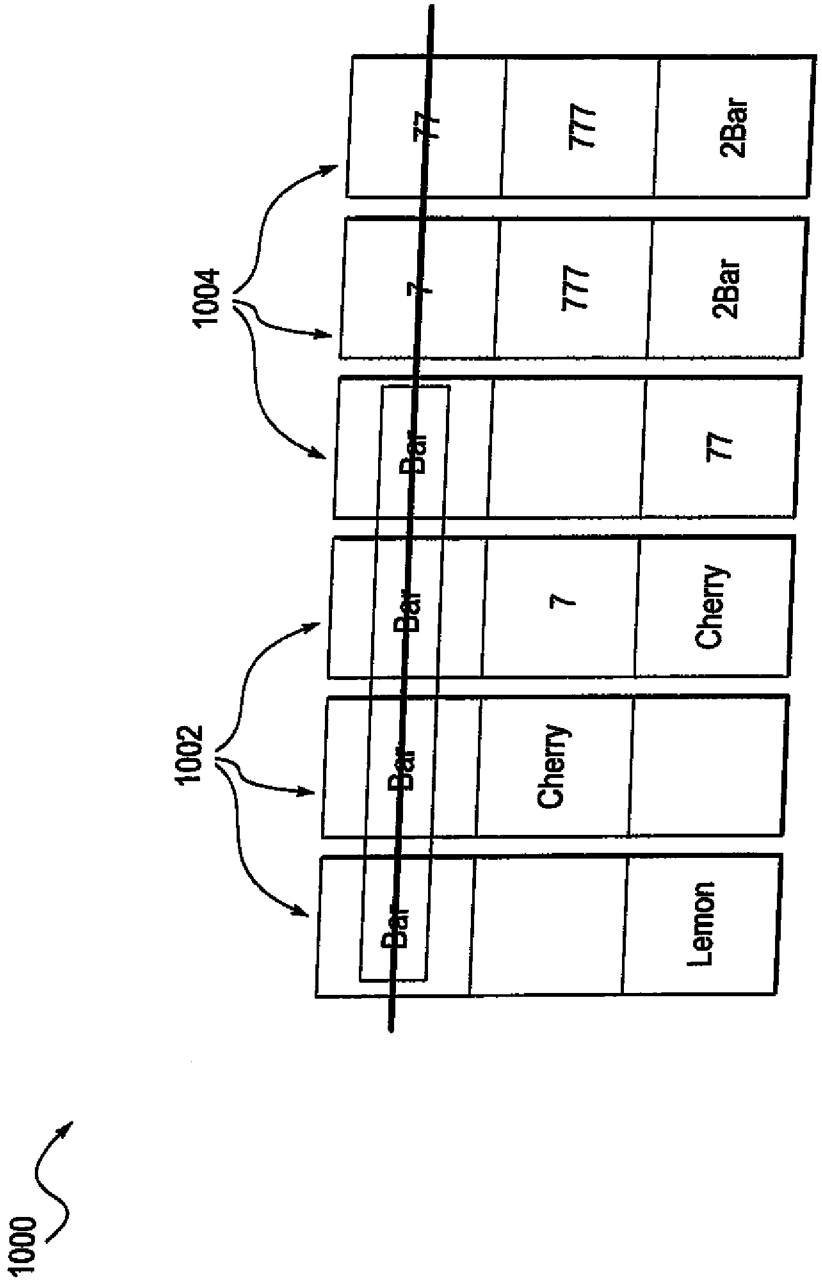

Next is FIG. 10 which illustrates a reel display 1000 that shows a player's reels 1002 and community reels 1004, uncovered by a transmissive display due to community play as disclosed in FIG. 9. As previously described, wins are determined based on winning lines combinations from the player's reels 1002 and the community reels 1004. Again, reels 1002 and 1004 may be mechanical or video reels or combinations thereof. As indicated previously, when video reels are involved, use of a transmissive display, for purposes of blocking an underlying display, is optional. In one embodiment, the community reels spin every "X" seconds and a player can benefit from the community reels when he has enabled community play mode. In another embodiment, a player may pay a larger fee or perhaps a maximum bet to obtain use of the community reels 1004 during non-community play. Maximum bet may also be used as a signal to start community play.

Figure 11:
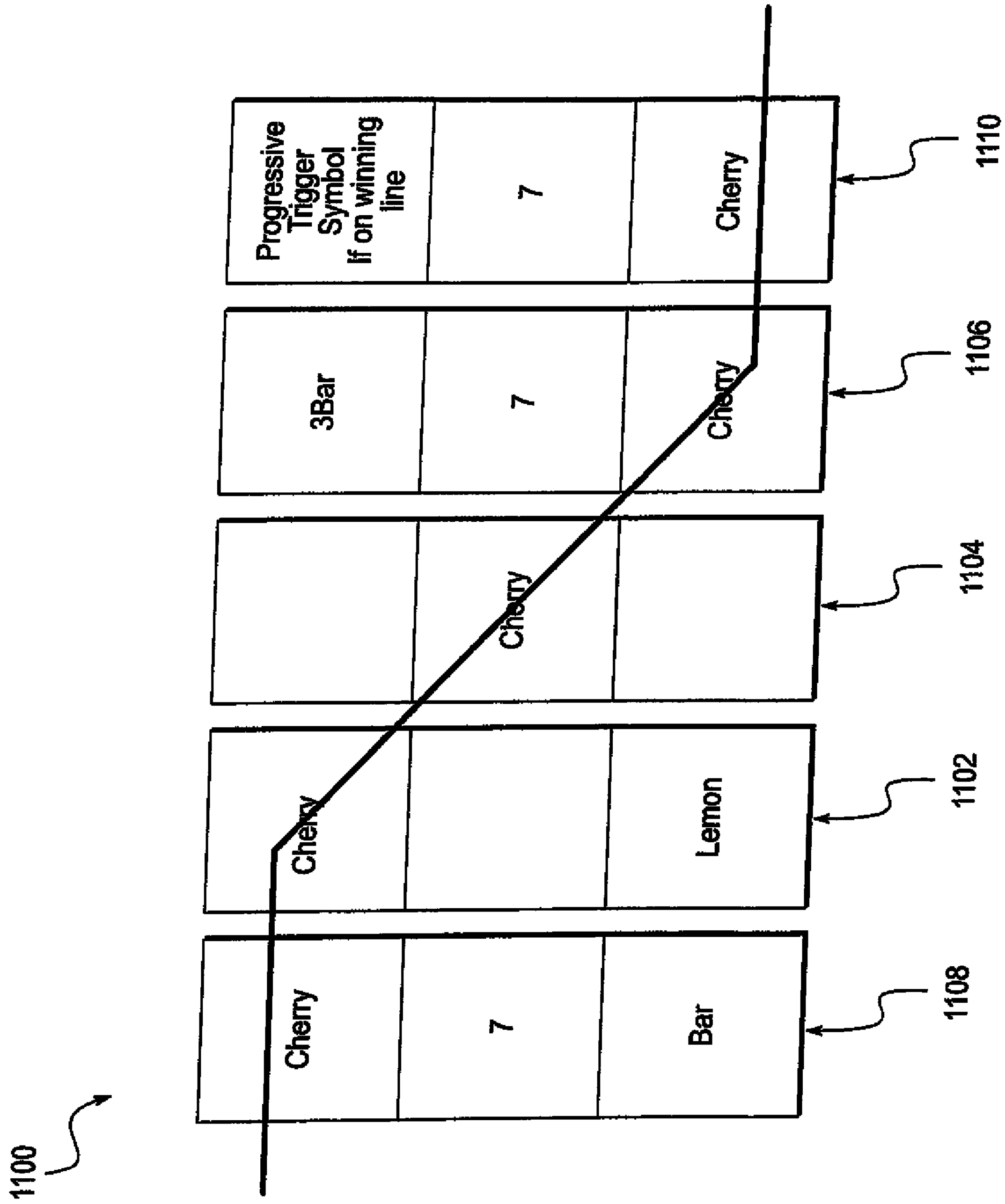

FIG. 11 illustrates a reel display 1100 from a first player's perspective. In non-community play mode a first player is paid for winning lines from center reels 1102, 1104 and 1106. The first player may bet an extra wager to obtain use of another reel. For purposes of this example, the first player obtains use of reel 1108. When this occurs, a second player will have an option to join in community play. If that occurs, the remaining reel 1110 will also be available to the first player. Also, the second player will also have access to all the reels (1102-1110) as he elected to participate in community play. Again, use of a transmissive display may be employed to block out a view of a reel not currently in use. Also, the reels (1102-1110) may be mechanical or video reels. Additionally, the first and second players may be sitting side-by-side, facing each other or perhaps some other configuration.

For reel view 1100, the first player would be awarded three cherries in non-community play mode, the three cherries on reels 1102, 1104 and 1106. If the first player elected to choose community play, by betting an extra wager, but the second player has not yet accepted an invitation to do so, the first player would also be rewarded the cherry from reel 1108. If the second player joined community play then the first player is additionally awarded the cherry on reel 1110.

In one embodiment, special symbols or combos may be allowed to show up only on outer reels 1108 and 1110. Since those symbols will typically only be available if a second player is playing, this will encourage the first player to get a second player or play two or more machines at once. An example of a special symbol may be one that triggers a progressive gaming session.

Figure 12:
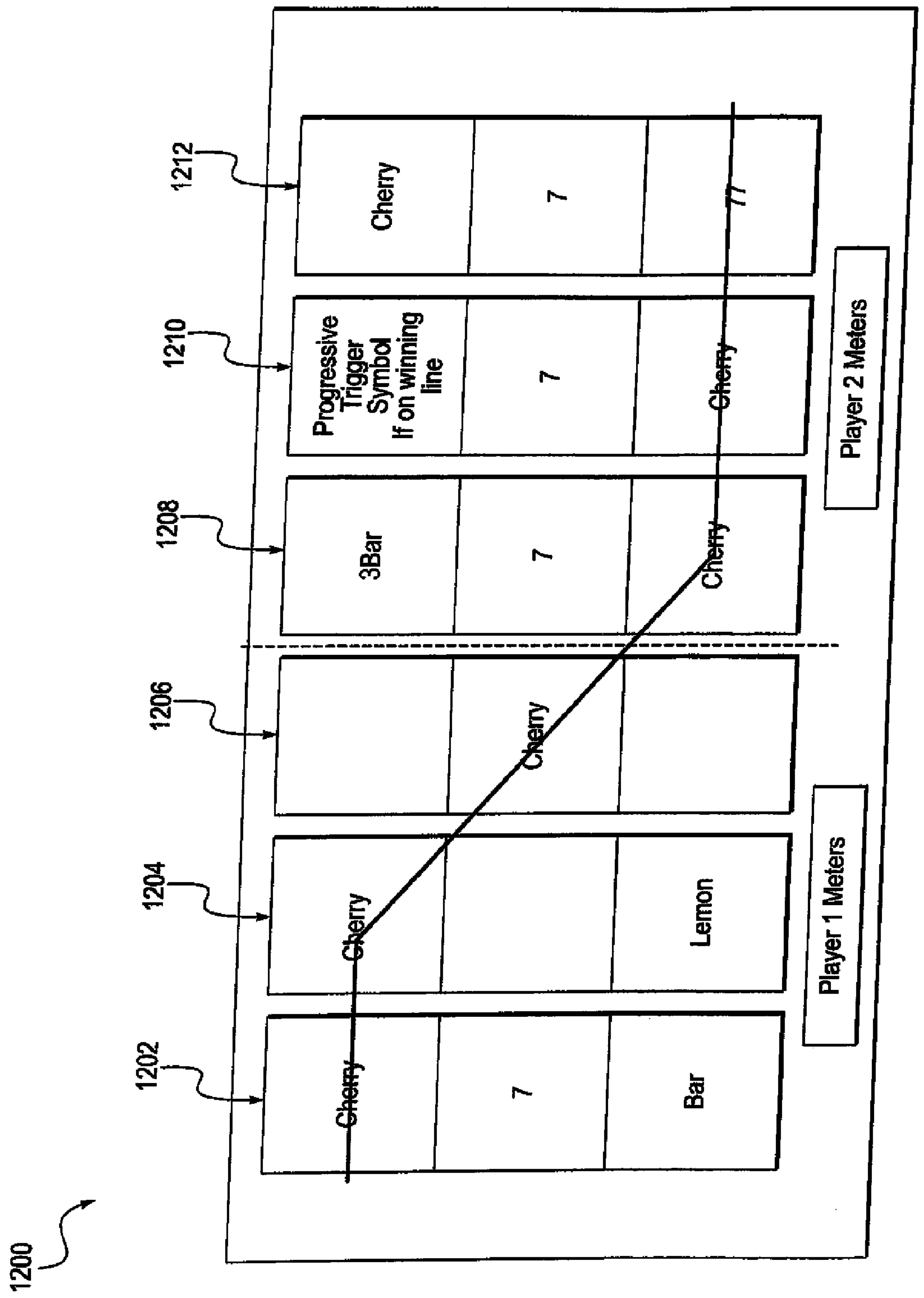

FIG. 12 illustrates a reel display 1200 of a gaming machine. During non-community play mode, a first player has access to reels 1202, 1204 and 1206 and a second player has access to reels 1208, 1210 and 1212. During community play, the first and second players both have access to all the reels (1202-1212) tor potential winning combinations. In one embodiment, a left-most game would pay left to right (1202 through 1212), and a right-most game reels would pay right to left (1212 through 1202). Due to this, a winning line for one player may not be a winning line for another player. In another embodiment, if common symbols show up on each set of reels (1202-1206 and 1208-1212) then a player may get paid for both sets of reels, for those lines they had paid for.

In another embodiment, an overhead display (not shown) may display 1 to N player's reels, from individual gaming machines. Each player would have their own player controls, bill acceptor, ticket printer and player tracking system displays, but they would be using a common video display. Each player will have their own display in addition to the overhead display. A touchscreen event on any one player's display would be sent to a CPU of the gaming machine and CPUs of other gaming machines. Or, the touchscreen or cabinet button event may be sent to a CPU of a zone of the overhead display associated with that CPU. A player would get the benefit of the new larger combinations created when multiple players' reels are combined. Players may sit adjacent to each other, so they build continuous lines that pay on their adjacent reels. For example if there are 5 cabinets in a line and each cabinet can drive one reel on the overhead sign then there is a benefit for people to sit in the left most seats since the community sign display game pays left to right. People would probably seat themselves on seats 1, 2, 3, 4 and 5 from left to right. This likely will pull people together into a tighter play group than they might otherwise. If all 5 people play their main game then all 5 bonus reels are preferably enabled on the overhead display sign and better winning combinations may be achieved if just 2 players playing on EGM's 1 and 2. Each reel on the community sign may have an EGM number, player name or other indicia to indicate which EGM is driving which reel(s) on the community reel display.

Data from each gaming device CPU could be sent to other gaming device CPUs to pass the knowledge of reel symbols that were determined by each other's random number generator and to provide synchronization between spins and other messaging to enable buddy play. Alternately a controller or server may be provide the game information including reel stops, random numbers, random number seeds and relay the information to the gaming devices CPUs.

Figure 13:
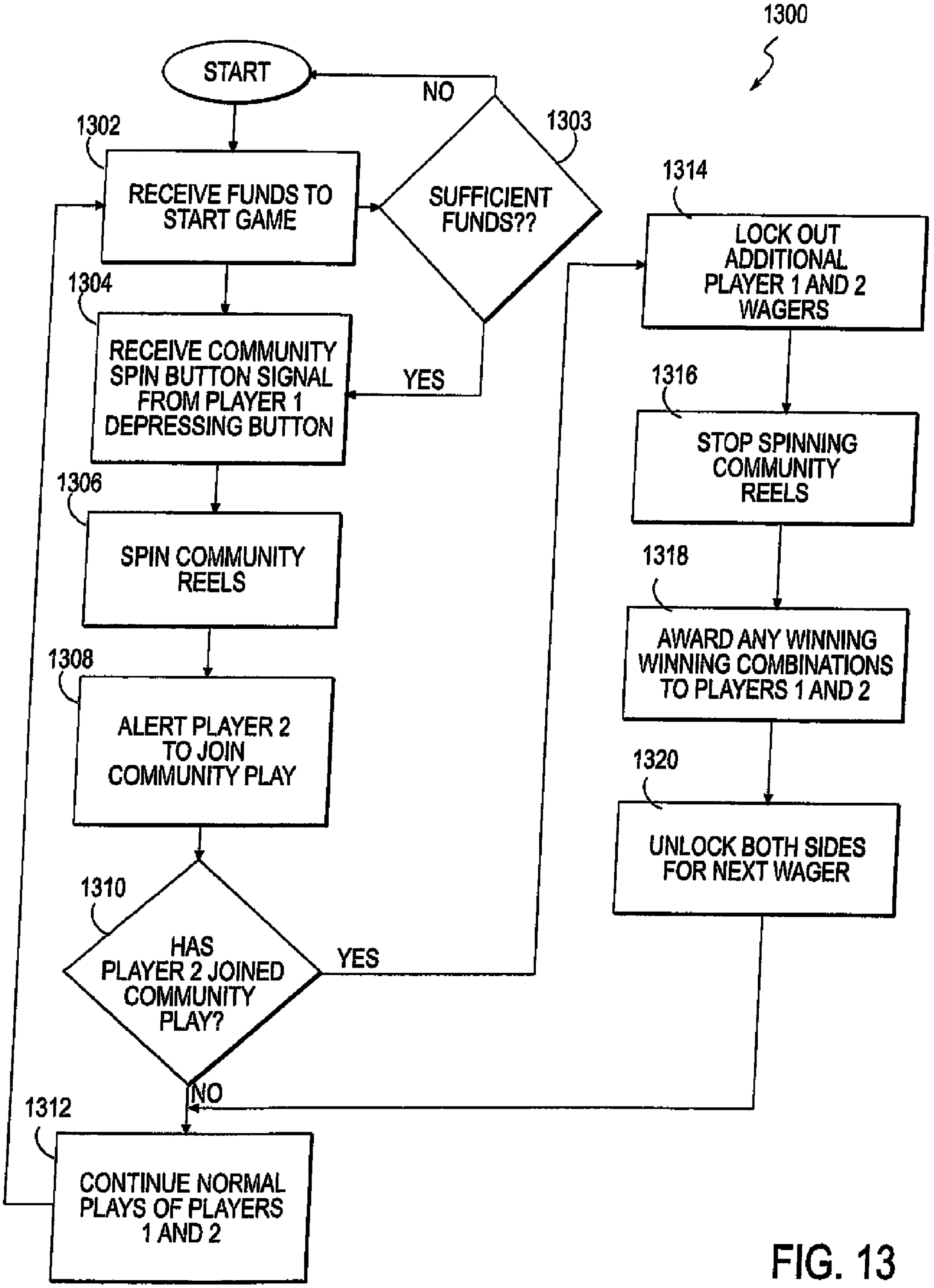
FIG. 13 is a flowchart illustrating an example method for initiating community play, in accordance with an embodiment.
Figure 14:
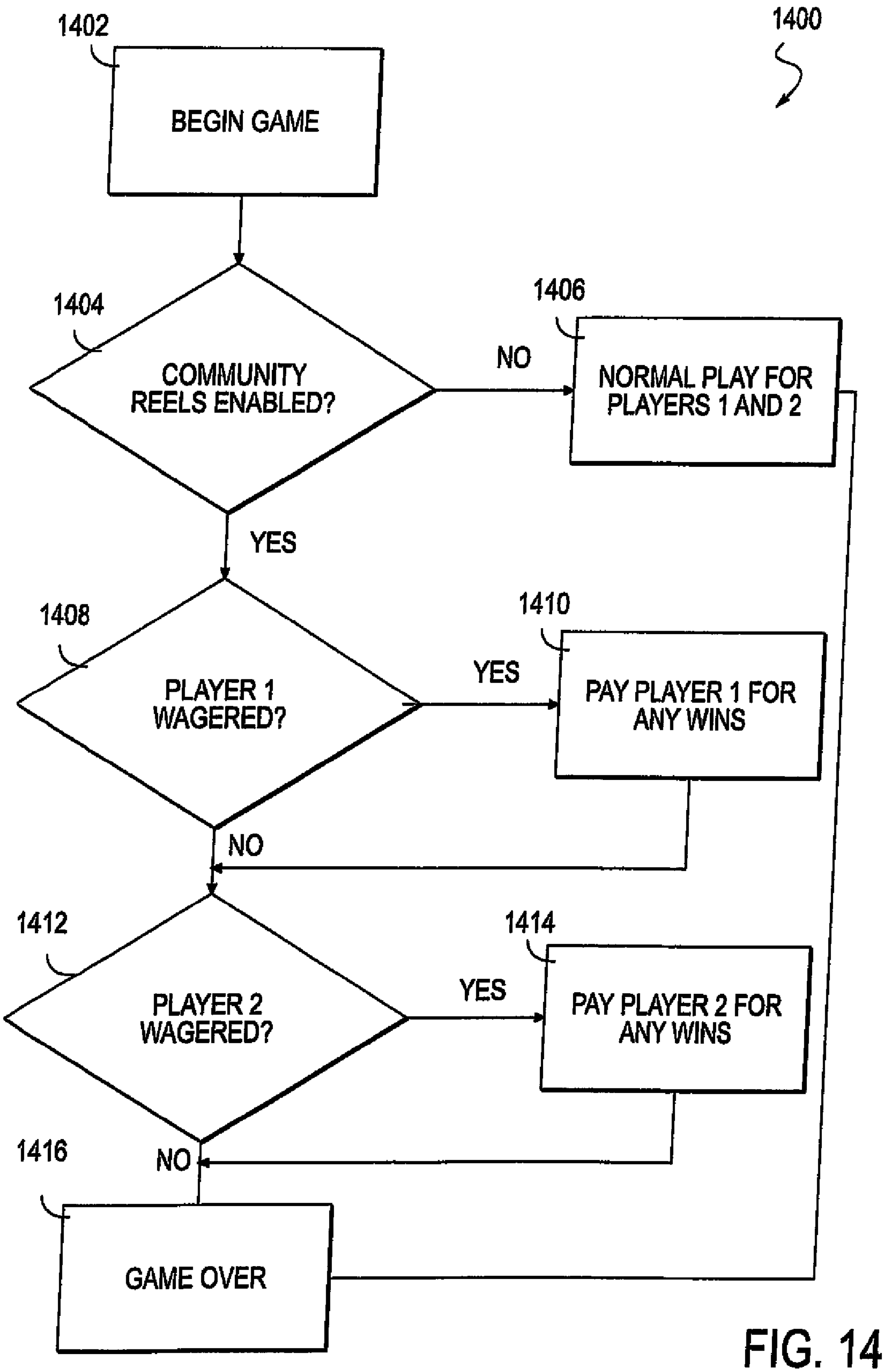
FIG. 14 is a flowchart illustrating an example method for a player to engage in community play, in accordance with an embodiment.

FIGS. 13-14 are flowcharts illustrating methods for community play. Beginning with FIG. 13, FIG. 13 describes a method 1300 wherein a first player initiates community play. Method 1300 may be implemented by a processor or CPU such as CPU 205 of FIG. 2. First, funds are received from a first user to start a game session 1302. If there are sufficient funds 1303 then a community spin signal initiates community play 1304, via the first player depressing a community spin button, or equivalents thereof. Community reels then spin 1306, alerts a second player to join community play 1308 and it is determined 1310 if the second player agrees to join community play. An example of how the second player may agree to join community play is if they depress their community play button. Again, other input-types can be utilized by the second player to signal that they will participate in community play. Typically, the second player will be given a time period in which to participate in community play. If the time period expires and no selection has been made, then community play is canceled. A player may elect to press his or her spin/play button and play his own standalone game and not join the community reels experience.

If the second player elects to not join community play 1310, normal play for the first and second players continue 1312. Otherwise, additional wagers, from the first and second players, is locked out 1314 and spinning of the community reels stops 1316. As previously indicated, community reels may include specially-designated reels combined with a player's reels, combining reels from a first and second player, awarding combinations to both players based on reels of each player, etc. Any winning combinations are then awarded to the first and second players 1318 and play stations of the first and second player are unlocked for a next wager 1320.

FIG. 14 shows a method 1400 for determining whether to pay players when community play is enabled. For example, a player may choose to institute community play by wagering a bet of a certain size wherein participation of another player is not required to participate in order for community play to continue. After a game is started 1402, CPU 205 determines 1404 if community reels have been enabled, such as by a player wagering a bet of a certain size. If not, normal play continues 1406 for the first and second players. If yes, CPU 205 determines if the first player has wagered 1408, if any. If yes, CPU 205 pays the first player for any wins 1410. Next, CPU 205 determines if the second player wagered on community play 1412. If yes, the CPU pays the second player for any wins 1414. The gaming session then ends 1416.

Figure 15:
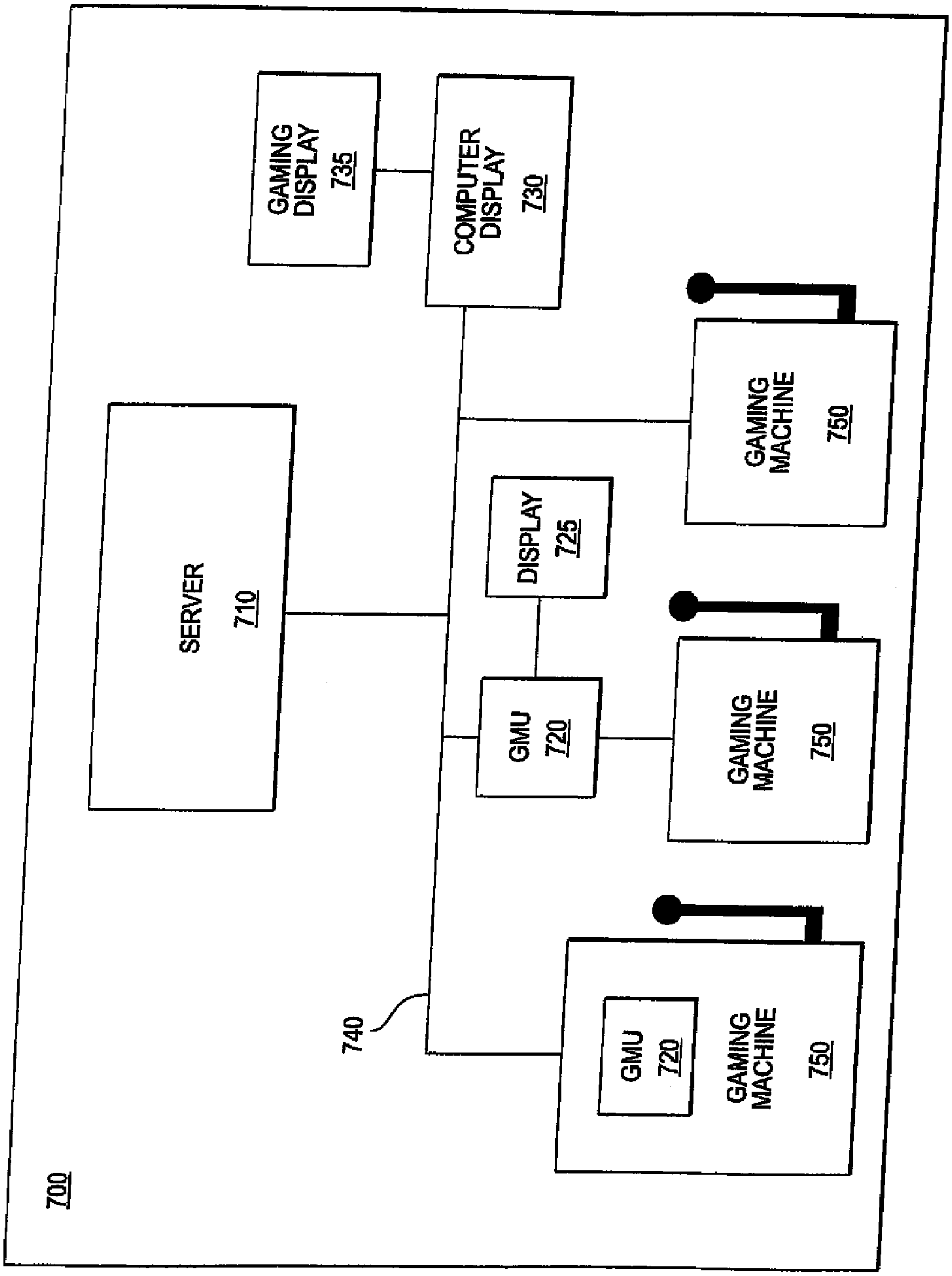
FIG. 15 is a block diagram illustrating elements of an example of a networked gaming system, in accordance with an embodiment.

FIG. 15 is a block diagram illustrating hardware elements of a networked gaming system 700, in accordance with an embodiment. System 700 includes server 710, gaming machines 750 and network 740 connecting gaming machines 750 to server 710. Additionally, gaming display computer 730 is shown to network 740. Server 710 may be selected from a variety server types. The type of server used is generally determined by the platform and software requirements of the gaming system. Examples of suitable servers are an IBM RS6000-based server, an IBM AS/400-based server or a Microsoft Windows-based server, but it should be appreciated that any suitable server may be used. The server 710 may be configured as a single "logical" server that comprises multiple physical servers. Gaming machines 750 operate similar to conventional peripheral networked terminals. Gaming machines 750 have a player interface such as a display or Bally iVIEW 725, a card reader and selection buttons through which gaming machines 750 interact with a player playing a wagering game. The player interface is used for making choices such as the amount of a bet or the number of lines to bet. Gaming machines 750 also provide information to server 710 concerning activity on gaming machines 750 and provide a communication portal for players with server 710. For example, the player interlace may be used or selecting different server-related menu options such as, but not limited to, transferring a specified number of credits from a player account onto the credit meter of the gaming machine, or for transferring credits from the gaming machine to a central player account.

In various embodiments, any of the gaming machines 750 may be a mechanical reel spinning gaming machine, a video reel spinning gaming machine or combinations thereof that include a point-based award. Networking components (not shown) facilitate communications across network 740 between the system server 710 and game monitoring units ("GMU") 720. Bally iVIEW 725 and/or gaming display control computers 730 that control displays for carousels of gaming machines. GMU 720 connects gaming machines to networking components and may be installed in the gaming machine cabinet or external to the gaming machine. The function of the GMU is similar to the function of the a network interface card connected to a desktop personal computer ("PC") and it may contain tracking software which provides notification to the casino of certain events on a gaming machine 750, including wins, accounting data, player tracking and session data. Depending upon the casino management system, payouts on large wins at gaming machines 750 may be made directly to a player account managed by the host computer; in which case, the player is notified by of the GMU at gaming machine 750 that the players account has been credited.

Some GMU's have much greater capability and can perform such tasks as presenting a game having a point-based award using a display 725 operatively connected to GMU 720. In various embodiments, GMU 720 is located outside or inside the gaming machine. Optionally, in an alternative embodiment, one or more gaming machines 750 connect directly to the network and are not connected to a GMU 720.

Displays related to games offering a point-based award on gaming machines 750 or GMU displays 725 may also be presented on gaming display 735 by gaming display controller 730.

A gaming system of the type described above also allows a plurality of games, in accordance with the various embodiments, to be linked under the control of server 710 for cooperative or competitive play in a particular area, carousel, casino or between casinos located in geographically separate areas.

It should also be noted that a gaming system may also comprise other types of components and the above illustrations are meant only as examples and not as limitations to the types of components or games having a point-based award. Additionally, it may further be appreciated that each of the games could be operated on a remote host computer such that a player initiates play with the host computer over a network via the player interlace and gaming machine 750 operates the respective gaming and video displays in conjunction with the game whose play is controlled by die remote computer.

It should furthermore be noted that certain combinations described herein may be used in non-gaming environments, such as in an arcade environment (e.g. with games of skill rather than games of chance), as indicators, etc. as will be appreciated by those of skill in the art.

While a number of example aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for playing a game comprising:

receiving a physical item associated with a monetary value that establishes a credit balance from a first player at a first play station having a first reel display comprising a plurality of reels to start a normal game session for normal play;

receiving a community spin signal from the first player to begin community play during the normal game session;

initiating a community play game session in response to receiving the community spin signal from the first player to begin community play during the normal game session;

activating a first community reel display at the first play station in response to the community spin signal, the first community reel display having one or more community reels associated with the plurality of reels comprising the first reel display of the first play station;

activating a second community reel display at a second play station in response to the community spin signal, the second community reel display having one or more community reels associated with a plurality of reels of a second reel display of the second play station;

spinning the community reels in response to activating the first community reel display and the second community reel display;

giving a second player at the second play station an option to join community play;

upon determining that the second player has elected to join community play; stopping the spinning of the first community reel display and the second community reel display:

determining if combining the first reel display with the one or more community reels of the first community reel display results in one or more winning combinations;

determining if combining the second reel display with the one or more community reels of the second community reel display results in one or more winning combinations; and awarding winning combinations to the first and second players, wherein awards for winning combinations are enhanced compared to winning combinations during normal play; and upon receiving a cashout input from the first player, initiating a payout from the credit balance.

2. The method as recited in claim 1, further comprising determining if there are sufficient funds received from the first player to start the normal game session and enabling the start of the normal game session only if sufficient funds have been received from the first player.

3. The method as recited in claim 1 wherein the first player depresses a community play button of the first play station to begin community play during the normal game session.

4. The method as recited in claim 1 wherein the first and second community reels comprise one or more dedicated reels that are specifically reserved as community reels that may be used in various combinations with the first reel display of the first play station and with the second reel display of the second play station, respectively.

5. The method as recited in claim 4 wherein spinning the community reels alerts the player at the second play station of the option to join community play.

6. The method as recited in claim 1 wherein the option for the second player to join community play is available for a predetermined period of time.

7. The method as recited in claim 6 wherein community play is cancelled if the predetermined time period expires before the second player elects community play.

8. The method as recited in claim 1 wherein the second player elects to join community play by depressing a community play button of the second play station.

9. The method as recited in claim 1, further comprising continuing normal play for the first and second players if the second player elects not to join community play.

10. The method as recited in claim 1, further comprising locking out additional wagers from the first and second players in response to determining that the second player elected to join community play.

11. The method as recited in claim 1, further comprising continuing normal play after the community play game session ends in response to awarding winning combinations.

12. The method as recited in claim 1 wherein awards for winning combinations are enhanced by at least one of higher payout tables, different game settings, frequency of wins, and payout percentages.

13. A method for playing a game comprising:

receiving a physical item associated with a monetary value that establishes a credit balance from a wagering player who is one of a plurality of players at a plurality of play stations to start a normal game session for normal play, each play station having a reel display comprising a plurality of reels;

receiving a community spin signal from the wagering player to begin community play during the normal game session;

initiating a community play game session in response to receiving the community spin signal from the wagering player to begin community play during the normal game session;

activating a community reel display at the play station of the wagering player in response to the community spin signal, the community reel display of the play station of the wagering player having one or more community reels associated with the plurality of reels comprising the reel display of the play station of the wagering player;

activating a community reel display of at least one other play station of the plurality of play stations in response to the community spin signal, the community reel display of the at least one of the other play stations of the plurality of play stations having one or more community reels associated with a plurality of reels of a reel display of the at least one of the other play stations of the plurality of play stations;

spinning the community reels in response to activating the community reel displays;

giving a player of at least one of the other of the plurality of play stations an option to join community play;

upon determining that the player at the at least one other of the plurality of play stations has elected to join community play:

stopping the spinning of the community reels;

determining if combining the reel display with the one or more community reels of the community reel display for the wagering player results in one or more winning combinations;

determining if combining the reel display with the one or more community reels of the community reel display for the player at the at least one other of the plurality of play stations results in one or more winning combinations;

awarding winning combinations to the players, wherein awards for winning combinations are enhanced compared to winning combinations during normal play and upon receiving a cashout input from the wagering player, initiating a payout from the credit balance.

14. The method as recited in claim 13 wherein spinning the community reels alerts other players of the option to join community play.

15. The method as recited in claim 13, further comprising continuing normal play for players at the plurality of play stations if no player at the other of the plurality of play stations elects to join community play.

16. The method as recited in claim 13, further comprising continuing normal play after the community play game session ends in response to awarding winning combinations.

17. The method as recited in claim 13 wherein awards for winning combinations are enhanced by at least one of higher payout tables, different game settings, frequency of wins, and payout percentages.

18. A method for playing a game comprising:

receiving a physical item associated with a monetary value that establishes a credit balance from a first player at a first play station having a first reel display comprising a plurality of reels;

initiating a community play game session in response to a wager of at least a predetermined amount being received from the first player;

activating a first community reel display at the first play station in response to initiating the community play game session, the first community reel display of the first play station having one or more community reels associated with the plurality of reels comprising the first reel display of the first play station;

activating a second community reel display at a second play station in response to initiating the community play game session, the second community reel display of the second play station having one or more community reels associated with a plurality of reels of a second reel display of the second play station;

spinning the one or more community reels of the first community reel display and spinning the one or more community reels of the first community reel display;

giving a second player at the second play station an option to join community play by wagering at least the predetermined amount;

stopping the spinning of the first and second community reels;

determining if combining the first reel display with the one or more community reels of the first community reel display for the first player results in a winning combination at the first play station;

upon determining that the second player elected to join community play by placing a wager of a least the predetermined amount:

determining if combining the second reel display with the one or more community reels of the second community reel display for the second player results in a winning combination at the second play station if the second player elected community play;

awarding one or more winning combinations, wherein awards for winning combinations are enhanced by at least one of higher payout tables, different game settings, frequency of wins, and payout percentages; and upon receiving a cashout input from the first player, initiating a payout from the credit balance.

19. The method as recited in claim 18 wherein spinning the community reels alerts the player at the second play station of the option to join community play.

20. The method as recited in claim 18, further comprising continuing normal play for the player at the second play station if the player at the second play station does not elect to join community play.

* * * * *